Jan. 20, 1959         J. D. McGEE         2,869,803
VEHICLES
Filed March 17, 1953
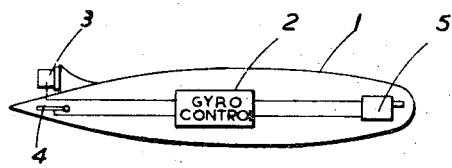
FIG. 1.
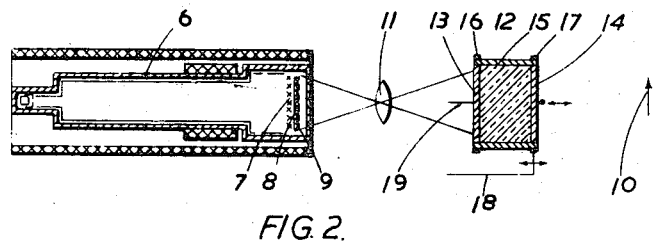
FIG. 2.
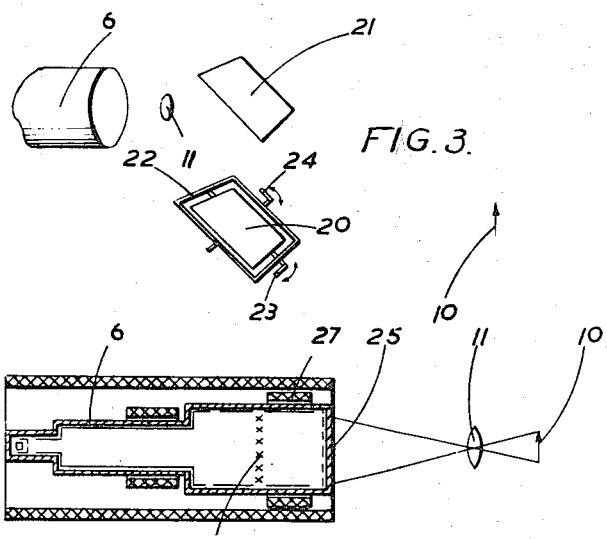
FIG. 3.
FIG. 4.
Inventor
JAMES DWYER McGEE
Attorneys

United States Patent Office 2,869,803
Patented Jan. 20, 1959

2,869,803

VEHICLES

James Dwyer McGee, Ealing, London, England, assignor to Electric & Musical Industries Limited, Hayes, England, a British company Application March 17, 1953, Serial No. 342,799

Claims priority, application Great Britain March 18, 1952

4 Claims. (Cl. 244—14)

This invention relates to vehicles of the kind which are constructed to move along a predetermined course under the control of suitable mechanism provided on the vehicle and the invention relates in particular but not exclusively to guided aerial missiles.

In guided aerial missiles it has been proposed to incorporate therein a television camera which is adapted to transmit signals derived from an image of a target to a control station, such as an aircraft from which the missile is launched, from which the course of the missile can be controlled so as to guide the missile to a target. A missile as hereinbefore described is fully illustrated in "Television equipment for guided missiles" by C. J. Marshall and L. Katz, page 375 of the Proceedings of the I. R. E., June 1946. It will be appreciated that during the flight of the missile the course of the latter is likely to vary in pitch and yaw and in order to stabilise the pitch and yaw usually some form of stabilising device is provided such as a gyroscopic control, which serves to counteract variations in pitch and yaw.

During variations in pitch and yaw relative movement occurs between the target to which the missile is directed and the television camera. This relative movement is undesirable since it is necessary for the signals transmitted by the missile to reproduce a picture of the target at all times for observation by the operator guiding the missile and furthermore, it is undesirable that rapid movement of the image projected on to the target electrode of the pick-up tube of the television camera should occur, since otherwise if a charge storage target electrode is employed blurring of the image will result. The more efficient the charge storage the more serious will be the blurring and with pick-up tubes employing full storage rapid movement results in serious loss of picture detail.

The object of the present invention is to provide an improved arrangement in which relative movement between the image projected on to the television camera is reduced when undesired changes in attitude of the vehicle occur.

According to the present invention there is provided a vehicle having mechanism for controlling the course of the vehicle, stabilising means coupled to said controlling mechanism for counteracting undesired variations of attitude of said vehicle, a television camera carried by said vehicle, means for projecting an image of a target on to said camera, means carried by said vehicle for transmitting signals generated by said camera to a control station and means controlled by said stabilising means for changing the attitude of said image relatively to the camera in opposite manner to changes in attitude of the vehicle and said target. Either an optical image of the target may be controlled for the purpose in view or alternatively, an electronic image of the optical image may be so controlled.

In order that the said invention may be clearly understood and readily carried into effect, it will now be more fully described, as applied by way of example to a guided aerial missile, with reference to the accompanying drawings, in which:

Figure 1 illustrates diagrammatically a guided aerial missile embodying an arrangement according to the invention, Figure 2 illustrates a detailed view of the pick-up tube of a television camera incorporated in said missile and illustrating an optical system for controlling the movement of an optical image, Figure 3 is a diagrammatic view illustrating a different form of optical system for controlling the movement of an image, and Figure 4 is a diagram of a pick-up tube in which the movement of an electron image is controlled.

Figure 1 of the drawings illustrates a guided aerial missile 1 which is provided with a gyroscopic control indicated at 2, the missile being provided with suitable radio receiving equipment whereby signals transmitted from a control station can be picked-up by the missile and employed to set the course of the missile. The missile is guided on its course by adjustment of the rudder 3 and elevator 4 and the missile is maintained on its set course by the gyroscopic control 2 which functions in well-known manner. In the nose of the missile there is provided a television camera 5 on to which an optical image of a target is projected. The missile carries suitable transmitting apparatus and other equipment necessary for the operation of the camera 5, whereby electrical signals representative of the image of the target are transmitted to a control station such as an aircraft from which the missile is launched so that a picture of the target is reproduced at the control station to enable the missile to be guided in its appropriate course. A missile such as 1 is, during flight, likely to pitch and yaw and as a result, relative movement occurs between the camera 5 and the target. The gyroscopic control mechanism 2 serves to counteract these variations in direction and keeps the missile on its set course but during such changes in attitude the image which is projected on the camera 5 likewise moves relative to the sensitive electrode of the pick-up tube of the camera, with the result that the image of the target may disappear from view and moreover, as a result of rapid changes in attitude a satisfactory picture may not be observable at the control station due to blurring of the image. According, therefore, to the present invention the image of the target which is projected on to the camera 5 is moved in an opposite manner to the change in attitude of the missile relatively to the target so that in effect the image of the target remains in view on the television camera and substantially stationary.

Figure 2 of the drawings illustrates one way of carrying the invention into effect and in this embodiment of the invention a variable angle prism is employed in the optical path of the image which is projected on to the pick-up tube of the television camera. As shown in Figure 2, the pick-up tube 6 is illustrated as being of the kind employing cathode potential stabilisation, which type of tube is well-known in the television art and has at one end of the tube a target electrode comprising a photo-sensitive mosaic 7 mounted on a transparent insulating support 8 provided on the side opposite to the mosaic 7 with a transparent signal plate 9. Other details of the pick-up tube need not be described, since they form no part of the present invention. An optical image of a target 10 is projected by a lens 11 after passing through a variable angle prism indicated generally at 12 on to the target electrode of the pick-up tube which is scanned by a cathode ray beam to generate picture signals in well-known manner. The variable angle prism comprises circular glass plates 13 and 14 arranged at the ends of a rubber sleeve 15, the rubber sleeve being clamped around the periphery of the plates 13 and 14 by metal clamping bands 16 and 17. The space between the glass plates 13 and 14 is filled with a suitable high refractive index liquid such as castor oil. The plate 14 is coupled in any suitable manner to the gyroscopic control device 2 so that when the control device 2 operates to stabilise the course of the missile an opposite motion is imparted to the glass plate 14 which serves, in effect, to vary the angle of the prism and the direction of its slope so that the optical image which is projected through the prism is changed in attitude in an opposite sense to the change in attitude of the missile relatively to the target, whereby the image which is received on the target electrode of the pick-up tube remains substantially stationary. The glass plate 14 is, therefore, arranged to be tiltable in mutually co-ordinate directions, the tilting movement of the plate being accommodated by the rubber sleeve 15. The plate 14 is coupled by means of linkage 18 and 19 to the gyroscopic control device 2, this linkage preferably incorporating suitable servo-control devices. Instead of employing a variable angle prism of the construction shown in Figure 2, any other suitable variable angle prism can be employed. The use of a variable angle prism is particularly suitable when the missile is intended for night operation, since in general the optical image under such circumstances will be of monochromatic light. The optical image may, of course, be converted into an electron image prior to its projection on to the storage target electrode of the pick-up tube by employing a tube similar to that shown in Figure 4. If it is intended to employ a variable angle prism for daylight operation, then a suitable filter may be employed in the optical path prior to the filter so as to restrict the wavelengths of light which are allowed to pass through the prism to a narrow band in the region of maximum sensitivity of the pick-up tube.

Instead of employing the variable angle prism shown in Figure 2 a mirror system may be employed as shown in Figure 3. In this figure two substantially parallel inclined mirrors 20 and 21 are employed, the image 10 of the target being directed on to the mirror 20 from whence it is reflected on to the mirror 21 and is then reflected by the mirror 21 through the lens 11 and projected on to the pick-up tube 6. The mirror 20 is mounted in a gimbal 22 so that it is capable of pivoting movement about two mutually co-ordinate directions and is coupled by linkage 23 and 24 to the control mechanism 2.

Instead of controlling the optical image as in the arrangement shown in Figures 2 and 3, the television pick-up tube may be of the kind as shown in Figure 4, in which an optical image is converted into an electron image before being projected on to the storage target electrode of the pick-up tube. The optical image in such an arrangement is projected on to a continuous photo-electric cathode 25 and the electrons released by the optical image from said photo-electric cathode are focussed on to one side of a double-sided mosaic target electrode 26 where a charge image is built up, the other side of the target electrode being scanned by the beam of the tube in well-known manner. In this embodiment movement of the image on the target electrode is reduced by applying a control to suitable coils 27 which are arranged to move the electron image produced by the cathode 25 in an opposite direction to the movement which occurs between the optical image and the cathode 25. The coils 27 may be controlled by the application thereto of suitable currents which may be derived from potentiometers which are adjustable under the control of the gyroscopic mechanism 2. It will be appreciated that the arrangement shown in Figure 4 only serves to reduce movement of the image projected on to the mosaic 26 and does not serve to tend to maintain an image of the target 10 in view as do the arrangements shown in Figures 2 and 3.

Although the invention is of particular use in conjunction with guided missiles, it will be understood that the invention can be equally applied to other kinds of vehicles such as land vehicles, ships or submarine vehicles such as submarines or torpedoes.

What I claim is:

1. In a craft of the remotely guided type including: pitch and yaw controls, means responsive to received signals for establishing a desired course for the craft, gyro-controlled means for operating said pitch and yaw controls to maintain the craft generally on the course established by said signals subject to unavoidable momentary deviations resulting from external forces, and means including a television image pick-up camera carried by said craft for transmitting to a remote control station signals indicative of the position of a target relative to the course of said craft; the improvement which comprises means for shifting the effective image pick-up direction axis of said camera relative to said craft, and means connected to said gyro-controlled means for operating said shifting means to maintain the effective line of sight of said camera directed towards said target during the unavoidable deviations of the craft direction from the course specified by said received signals.

2. The invention in accordance with claim 1, in which the means for shifting the effective image pick-up direction of said camera comprises movable optical elements for altering the direction of rays incident thereon.

3. The invention in accordance with claim 2, in which said optical elements include a variable-angle prism.

4. The invention in accordance with claim 1, in which the means for shifting the effective image pick-up direction of said camera comprises electron beam deflection means forming a part of said camera.

References Cited in the file of this patent

UNITED STATES PATENTS

| | | |
|---|---|---|
| 1,709,314 | Henderson | Apr. 6, 1929 |
| 2,480,868 | Marshal | Sept. 6, 1949 |
| 2,569,473 | Hoover | Oct. 2, 1951 |
| 2,616,031 | Nosker | Oct. 28, 1952 |
| 2,649,262 | Fahrney | Aug. 18, 1953 |
| 2,680,578 | Katz | June 8, 1954 |

OTHER REFERENCES

"TV-Guided War Missile"; Television, January 1950, p. 59.